United States Patent
Hui et al.

(10) Patent No.: US 9,825,828 B2
(45) Date of Patent: Nov. 21, 2017

(54) CROSS-LAYER LINK FAILURE ALERTS

(71) Applicant: T-Mobile USA, Inc., Bellevue, WA (US)

(72) Inventors: Jie Hui, Mercer Island, WA (US); Yunhan Jia, Ann Arbor, MI (US); Jun Liu, Bellevue, WA (US); Kranthi Sontineni, Renton, WA (US)

(73) Assignee: T-Mobile USA, Inc., Bellevue, WA (US)

(*) Notice: Subject to any disclaimer, the term of this patent is extended or adjusted under 35 U.S.C. 154(b) by 244 days.

(21) Appl. No.: 14/547,833

(22) Filed: Nov. 19, 2014

(65) Prior Publication Data

US 2016/0065433 A1    Mar. 3, 2016

Related U.S. Application Data

(60) Provisional application No. 62/042,067, filed on Aug. 26, 2014.

(51) Int. Cl.
  *G06F 15/16* (2006.01)
  *H04L 12/26* (2006.01)
  *H04L 12/24* (2006.01)

(52) U.S. Cl.
  CPC ...... *H04L 43/0847* (2013.01); *H04L 41/0654* (2013.01); *H04L 43/0811* (2013.01)

(58) Field of Classification Search
  CPC .................................................. H04L 43/0847
  See application file for complete search history.

(56) References Cited

U.S. PATENT DOCUMENTS

| | | | | |
|---|---|---|---|---|
| 8,472,941 B1* | 6/2013 | Hong | ............ | H04W 24/10 370/328 |
| 2004/0111652 A1* | 6/2004 | Shoaib | ............ | H04L 41/0654 714/15 |
| 2005/0002400 A1* | 1/2005 | Karol | ............ | H04L 29/06027 370/394 |
| 2005/0249123 A1 | 11/2005 | Finn | | |
| 2009/0190480 A1* | 7/2009 | Sammour | ............ | H04L 1/1848 370/242 |
| 2011/0244911 A1* | 10/2011 | Kodama | ............ | H04W 4/20 455/517 |

(Continued)

FOREIGN PATENT DOCUMENTS

JP        2012054658        3/2012

OTHER PUBLICATIONS

Yu. Improving TCP Performance over Mobile Ad Hoc Networks by Exploiting Cross-Layer Information Awareness. MobiCom 2004.*

(Continued)

*Primary Examiner* — Bryan Lee
(74) *Attorney, Agent, or Firm* — Lee & Hayes, PLLC

(57) ABSTRACT

Described herein is a network device configured to determine and provide alerts of communication link failures across layers of a communication stack of the network device. The network device determines at a radio link layer of the communication stack that a communication link between the network device and a network has failed. The network device then alerts one or more components associated with another layer of the communication stack of the determination that the communication link has failed.

20 Claims, 3 Drawing Sheets

(56) References Cited

U.S. PATENT DOCUMENTS

| | | | |
|---|---|---|---|
| 2011/0280135 A1* | 11/2011 | Thomas | H04L 1/0061 370/241 |
| 2013/0288665 A1 | 10/2013 | Gao et al. | |
| 2014/0036659 A1* | 2/2014 | Gao | H04W 24/04 370/216 |
| 2015/0087317 A1* | 3/2015 | Yiu | H04W 24/04 455/441 |
| 2016/0057802 A1* | 2/2016 | Lee | H04W 76/025 370/329 |
| 2016/0182276 A1* | 6/2016 | Wu | H04L 41/0654 370/225 |

OTHER PUBLICATIONS

Zhang et al. Implementation of Explicit Wireless Loss Notification Using MAC-Layer Information. IEEE 2003.*
The PCT Search Report and Written Opinion dated Nov. 18, 2015 for PCT application No. PCT/US2015/044486, 12 pages.

* cited by examiner

CROSS-LAYER LINK FAILURE ALERTS

RELATED APPLICATIONS

This patent application is a non-provisional of and claims priority filing benefit from U.S. Provisional Patent Application No. 62/042,067, filed Aug. 26, 2014. Application No. 62/042,067 is hereby incorporated by reference, in its entirety.

BACKGROUND

Traditionally, telecommunication services such as voice calling have been provided over circuit-switched networks. In such networks, failures of communication links with networks are quickly detected by radios of telecommunication devices and realized by components of the telecommunication devices, resulting in prompt termination or halting of any services dependent on the failed links. In computers utilizing packet-based data networks, by contrast, there is often a delay between the loss of connectivity and the realization of the loss by applications of the computer. This is due to the fact that losses of connectivity are detected independently by components of different layers of a communication stack, such as a Transmission Control Protocol/Internet Protocol (TCP/IP) stack, by use of timers, such as a Real-time Transport Protocol (RTP) timer. With telecommunication services being increasingly provided over packet-based data networks and utilizing communication stacks, components of telecommunication devices, such as voice calling applications, are experiencing delays in realizing failures of communication links.

FIG. 1 illustrates the delay between radio link layer awareness of a communication link failure and application layer awareness of that same failure. As illustrated, a communication stack 102 of a network device (such as, for example, a telecommunication device, an access network node, a core network node, etc.) may have a number of layers, such as a radio link layer 104, a protocol layer 106, and an application layer 108. Such a communication stack 102 may be any sort of communication stack, such as a TCP/IP stack. At a first time, a component at the radio link layer 104 may determine that a communication link is disconnected 110. Upon the failure of the communication link, a user of an application at the application layer 108, such as a voice calling application, may experience muting 112. Other real-time or substantially real-time applications may experience pausing after, e.g., a playback buffer falls below a threshold. Different components at different ones of layers 106 and 108 may then initialize one or more timers, such as an RTP timer or an application timer. These timers may be initialized sequentially, so that one is initialized after another times out. For example, an application timer may be initialized after an RTP timeout 114. During both periods of an RTP timeout 114 and an application timeout 116 of an application timer, a user of an application may continue to experience muting 118. After the expirations of the timers, the application may terminate or halt service. For example, a voice calling application may drop a call. Because each timer may wait for substantial period, e.g., twenty to thirty seconds, it may be forty seconds to one minute before a user application realizes that the communication link has failed. This may result, for instance, in a user continuing to talk for a substantial time in a phone call even after the connection carrying that phone call is lost.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, a network device (such as, for example, a telecommunication device, an access network node, a core network node, etc.) configured to determine and provide alerts of communication link failures across layers of a communication stack of the network device. The network device determines at a radio link layer of the communication stack that a communication link between the network device and a network has failed. The network device then alerts one or more components associated with another layer of the communication stack of the determination that the communication link has failed. In addition, when alerting across layers of the communication stack, the network device may also alert across a user plane and a control plane. For example, the detection of the failure may occur utilizing user plane traffic and an alert may be provided to a component utilizing control plane traffic.

Overview

Figure 1:
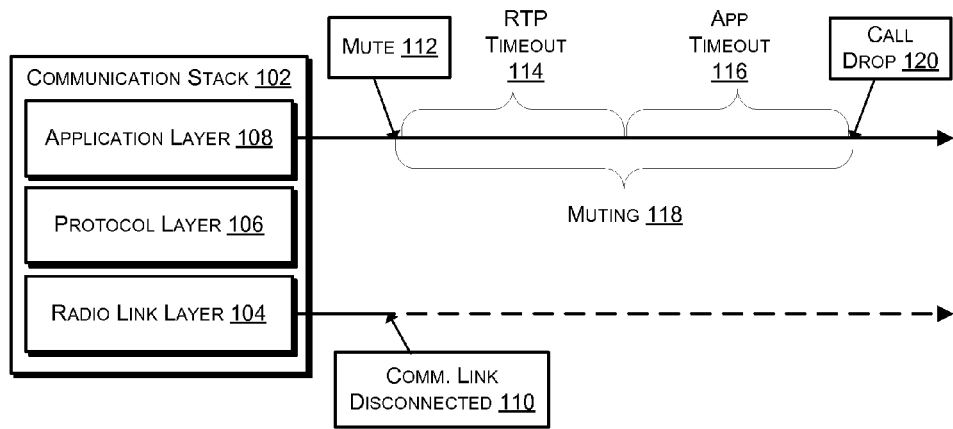
FIG. 1 illustrates the delay between radio link layer awareness of a communication link failure and application layer awareness of that same failure.
Figure 2:
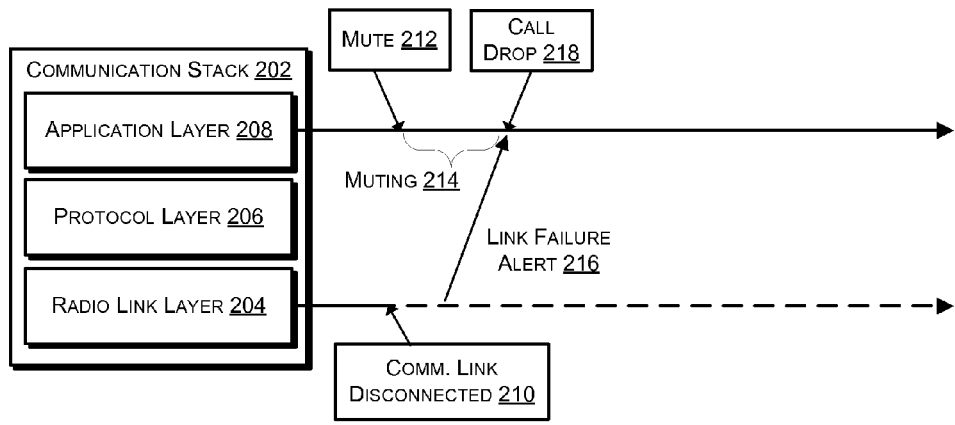
FIG. 2 illustrates techniques for alerting component(s) of other layers of a communication stack when a communication link failure is detected at a radio link layer of that communication stack.

FIG. 2 illustrates techniques for alerting component(s) of other layers of a communication stack when a communication link failure is detected at a radio link layer of that communication stack. As illustrated, a communication stack 202 of a network device (such as, for example, a telecommunication device, an access network node, a core network node, etc.) may include at least a radio link layer 204, a protocol layer 206, and an application layer 208.

Figure 3:
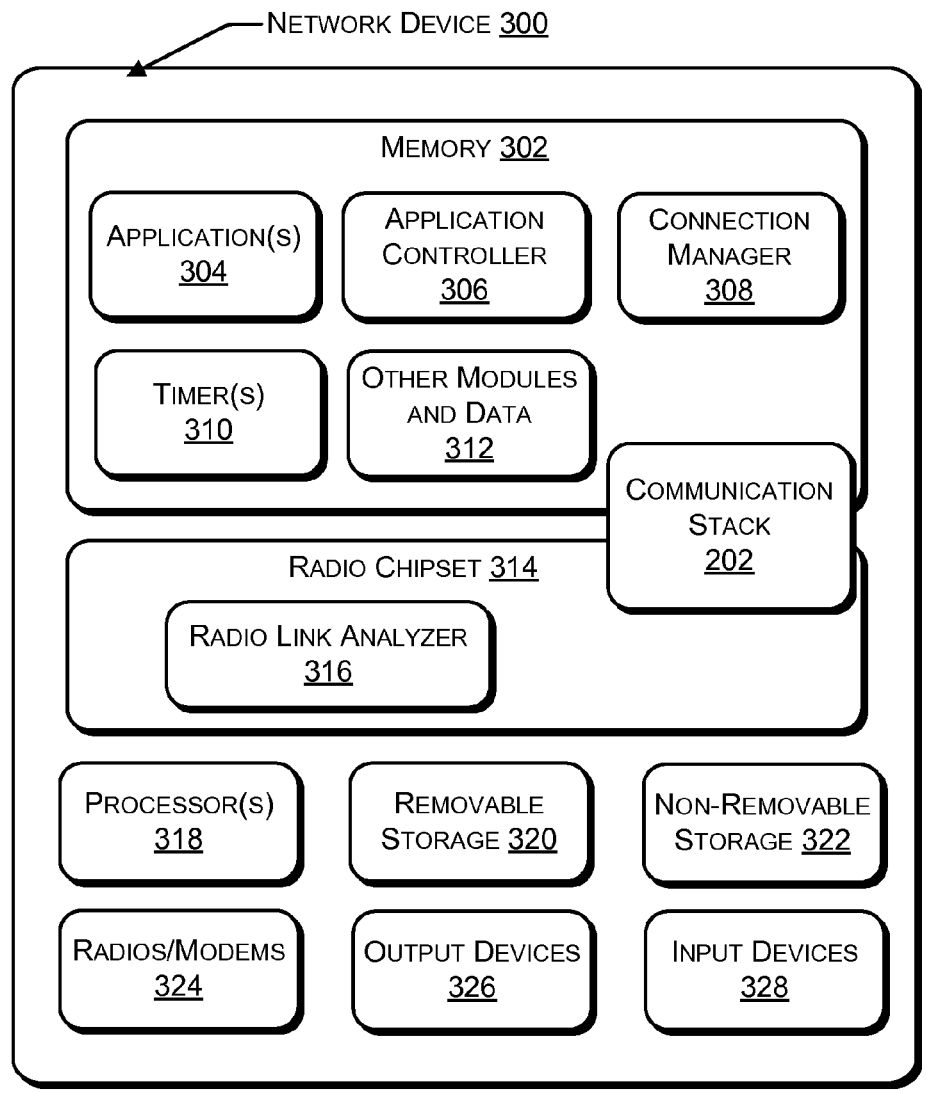
FIG. 3 illustrates a component level view of a network device configured to determine, at a radio link layer, failure of a communication link and to alert component(s) of other layers of the failure.

In various implementations, the network device which includes the communication stack 202 may be or include a personal computer (PC), a laptop computer, a server, a server farm(s), a mainframe, a tablet computer, a work station, a telecommunication device, a personal digital assistant (PDA), a media player, a media center device, a personal video recorder (PVR), a television, an electronic book reader, a set-top box, a camera, a video game console, a kiosk, a gaming device, processor(s), integrated components for inclusion in a computing device, an appliance, an electronic device for inclusion in vehicles, a gaming device, or any other sort of device. As mentioned, the network device may be any of a telecommunication device, a access network node, or a core network node. An example network device is illustrated in FIG. 3 and is described in detail below with reference to that figure.

The communication stack 202 may be any sort of communication stack, such as a TCP/IP stack.

The radio link layer 204 may be implemented entirely or in part by any or all of a radio or modem of the network device, by a radio chipset for managing the radio or modem, or by operating system or platform components of the network device. The radio link layer 204 may be associated with a radio analyzer configured to perform any of logging communication link events or monitoring and analyzing such events. Components associated with the radio link layer 204 may further enable the network device to establish and maintain communication links with one or more devices across a network, such as a telecommunication network, which may include one or more wireless networks, wired networks, or both.

The protocol layer 206 may represent any one or more layers of the communication stack, such as a transport layer or an Internet layer. Such layers may be responsible for host-to-host communication and may provide flow control and reliable transmission of data, may participate in connection establishment, and may provide control and addressing information in headers of network packets to transmit data from applications, such as applications at the application layer 208. In some implementations, the protocol layer 206 may include an RTP timer used by the protocol layer 206 to detect failure of a communication link.

The application layer 208 is the scope within which applications create and use data and communicate that data with other devices. Example applications include voice calling clients, Voice over Long Term Evolution (VoLTE) calling clients, WiFi calling clients, messaging applications, email applications, media player applications, video calling applications, video chat applications, web browsers, social media applications, any sort of real-time communication applications, or any other sort of applications.

In various implementations, an application may be engaged in communication with another device over a network via a communication link. The communication link may be established and managed at least partially in the radio link layer 204, which may log communication events, such as the sending and receiving of data packets. Any one or more components associated with the radio link layer 204, such as a radio link analyzer, may examine logs or monitor outgoing and incoming packets to determine a communication link disconnect 210. In some implementations, determining such a failure 210 may involve detecting loss of connectivity, waiting a threshold period of time, attempting one or more times during that threshold period of time to reestablish the communication link, and, if the communication link is not reestablished after the threshold time passes, determining that the communication link has failed.

Upon the failure 210 of the communication link, a user of an application at the application layer 208, such as a voice calling application, may experience muting 212. The user may continue to experience muting 214 until the application receives a link failure alert 216 or until timeouts of one or more timers, such as RTP timers or application timers, are reached. The link failure alert 216 is independent of any timers of the protocol layer 206 or application layer 208 and may be received before any or all of their timeouts are reached. In FIG. 2, the link failure alert 216 is received by the application before any timeout is reached, resulting in the application terminating or halting the user's communication (e.g., dropping a call 218).

The link failure alert 216 may result from the determination of the communication link failure 210 by the component(s) of the radio link layer 204, such as the radio link analyzer. Those component(s) of the radio link layer 204 may provide the link failure alert 216 to component(s) of other layers of the communication stack 202, such as the protocol layer 206 or the application layer 208, or may expose an indication of the link failure as a link failure alert 216 and receive polling from the component(s) of the other layers for the indication.

If providing the link failure alert 216 to other component(s) of other layers, the component(s) of the radio link layer 204 may provide the link failure alert 216 to one or more default component(s) of the other layers, may broadcast the link failure alert 216 to multiple components of the other layers, or may identify the other component(s) of other layers with reference to logs maintained by the component(s) of the radio link layer 204. For example, the radio link analyzer may reference logs that it or other components of the radio link layer 204 maintains to identify any components, such as applications, actively engaged in communication with another device. The radio link analyzer may then provide the link failure alert 216 to those identified applications. In another example, the radio link analyzer may provide a default component, such as an application controller or a connection manager associated with an operating system (OS) of the network device, with the link failure alert 216. Such an application controller or a connection manager may be a component of the protocol layer 206, such as a TCP layer component, a component of the application layer 208, or may be associated with both layers. That default component may then identify other components engaged in communication over the communication link, such as applications. To identify the other components, the default component may analyze logs of the protocol layer 206 or application layer 208, such as TCP logs. The default component may then provide the link failure alert 216 to those identified other components.

In various implementations, the component(s) of the radio link layer 204, such as the radio link analyzer, may provide the reason(s) for the link failure along with the link failure alert 216. Such reasons could include dropped packets, poor quality-of-service (QoS), delay, etc. The component(s) of the other layers receiving the link failure alert 216 and the reasons may take different actions depending on the reasons. For example, the component(s) may terminate a connection, wait until further instructions or link failure alerts 216 are received, attempt to reestablish a connection, etc. Different component(s) may take different actions responsive to a same reason or reasons.

In some implementations, rather than providing reasons, the component(s) of the radio link layer 204, such as the radio link analyzer, may instruct the components receiving the link failure alert 216 to terminate a connection, wait for further alerts or instructions, or to attempt to reestablish the connection. Such instructions may depend on the type of application receiving the instructions or on the type of communication engaged in by the application. Thus, the component(s) of the radio link layer 204 may instruct different components to take different actions.

Example Device

FIG. 3 illustrates a component level view of a network device configured to determine, at a radio link layer, failure of a communication link and to alert component(s) of other layers of the failure. As illustrated, the network device 300 comprises a system memory 302 storing application(s) 304, an application controller 306, a connection manager 308, timer(s) 310, other modules and data 312, and a part of the communication stack 202. Also, the network device 300 includes a radio chipset 314, which includes a radio link analyzer 316 and a part of the communication stack 202, processor(s) 318, a removable storage 320, a non-removable storage 322, radios/modems 324, output device(s) 326, and input device(s) 328.

In various implementations, system memory 302 is volatile (such as RAM), non-volatile (such as ROM, flash memory, etc.) or some combination of the two.

The application(s) 304 may be any sort of application(s), such as voice calling clients, VoLTE calling clients, WiFi calling clients, messaging applications, email applications, media player applications, video calling applications, video chat applications, web browsers, social media applications, any sort of real-time communication applications, or any other sort of applications. The application(s) 304 may engage in communication with other applications, servers, or devices via a communication link over a network, sending and receiving data packets. The application(s) 304 may also include timer(s) 310 initialized after each reception of each packet and may take some action, such as terminating a connection, waiting for further communications or alerts, or attempting to reestablish a connection. In some implementations, the application(s) 304 may receive link failure alerts, such as the link failure alerts 216, and reasons for the link failures. The application(s) 304 may each take different actions depending on the reasons and make take actions that are different from each other's actions. The application(s) 304 may be associated with an application layer 208 of the communication stack 202.

The application controller 306 may be a component of an operating system of the network device 300 responsible for managing or controlling some aspects or behaviors of application(s) 304. The connection manager 308 may be a component of an operating system of the network device 300 responsible for managing or controlling network connections of application(s) 304. The application controller 306 and/or connection manager 308 may maintain logs, such as TCP logs, and may act as intermediary components between the radio link analyzer 316 and the application(s) 304. The application controller 306 and/or connection manager 308 may receive link failure alerts 216, may analyze logs to identify application(s) 304, and may provide the link failure alerts 216 to the application(s) 304. The application controller 306 and/or connection manager 308 may also include timer(s) 310, such as an RTP timer, and may either take action, such as terminating a connection for an application 304, or initialize another timer 310, such as a timer 310 of an application 304, responsive to a timeout. The application controller 306 and/or connection manager 308 may be associated with a protocol layer 206 of the communication stack 202.

The timer(s) 310 may include the timer(s) 310 of the application(s) 304, the application controller 306, or the connection manager 308 and may also include other timer(s) 310 of the protocol layer 206 or application layer 208.

The other modules or data 312 stored in the system memory 302 may comprise any sort of applications or platform components of the network device 300, as well as data associated with such applications or platform components.

In various implementations, the radio chipset 314 may manage the radios and/or modems 324, causing them to establish or terminate communication links over a network. The radio chipset 314 may also log connection or communication events and monitor link metrics, such as QoS, delay, packet loss, etc. The radio link analyzer 316 may determine that a communication link has failed (based, e.g., on logs or link metrics) and either expose that link failure to polling or provide link failure alerts 216 to any or all of the application(s) 304, the application controller 306, or the connection manager 308. The radio link analyzer 316 may also provide the reason(s) for the link failure, instructions for actions to be taken by the application(s) 304, the application controller 306, or the connection manager 308, or both.

In some implementations, the processor(s) 318 is a central processing unit (CPU), a graphics processing unit (GPU), or both CPU and GPU, or any other sort of processing unit.

The network device 300 also includes additional data storage devices (removable and/or non-removable) such as, for example, magnetic disks, optical disks, or tape. Such additional storage is illustrated in FIG. 3 by removable storage 320 and non-removable storage 322.

Non-transitory computer-readable media may include volatile and nonvolatile, removable and non-removable tangible, physical media implemented in technology for storage of information, such as computer readable instructions, data structures, program modules, or other data. System memory 302, removable storage 320 and non-removable storage 322 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the network device 300. Any such non-transitory computer-readable media may be part of the network device 300.

In some implementations, the radios and/or modems 324 include any sort of radio, modems, or combinations thereof known in the art. For example, radios and/or modems 324 may include a radio transceiver that performs the function of transmitting and receiving radio frequency communications via an antenna. The radios and/or modems 324 may facilitate wireless connectivity between the network device 300 and various devices or one or more networks. In addition, the radios and/or modems 324 may also include a wireless communication transceiver and a near field antenna for communicating over unlicensed wireless IP networks, such as local wireless data networks and personal area networks (e.g., Bluetooth or near field communication (NFC) networks). Further, the radios and/or modems 324 may include wired communication components, such as an Ethernet port, that connect the network device 300 in a wired fashion to devices of one or more networks. In various implementations, the radios and/or modems 324 may interface with and be controlled by the radio chipset 314.

In some implementations, the output devices 326 include any sort of output devices known in the art, such as a display (e.g., a liquid crystal display), speakers, a vibrating mechanism, or a tactile feedback mechanism. Output devices 326 also include ports for one or more peripheral devices, such as headphones, peripheral speakers, or a peripheral display.

In various implementations, input devices 328 include any sort of input devices known in the art. For example, input devices 328 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

Figure 4:
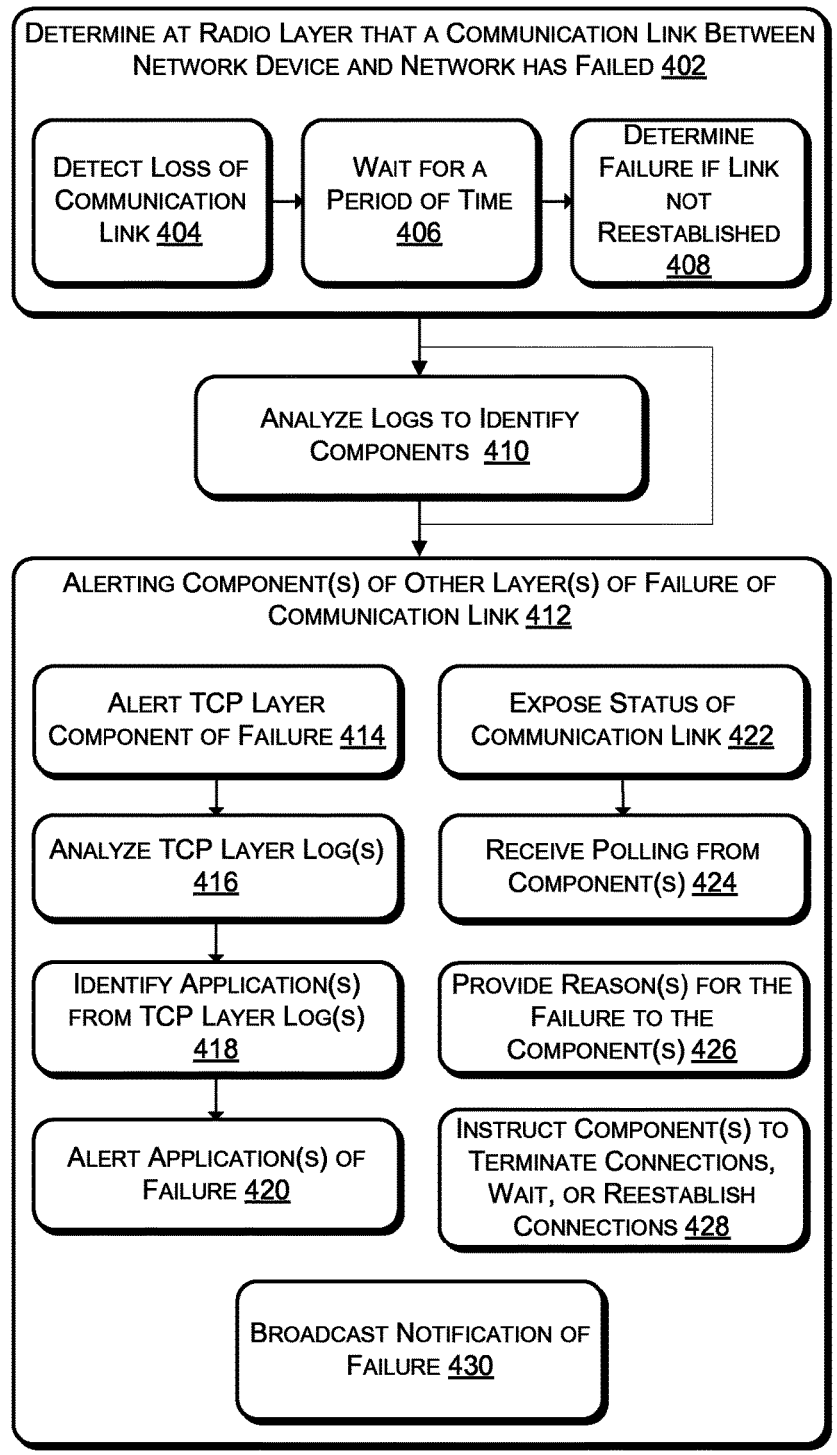
FIG. 4 illustrates an example process for determining, at a radio link layer, failure of a communication link and alerting component(s) of other layers of the failure.

FIG. 4 illustrates an example process. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process for determining, at a radio link layer, failure of a communication link and alerting component(s) of other layers of the failure. The process includes, at 402, a network device determining at a radio link layer of a communication stack of the network device that a communication link between the network device and a network has failed. In some implementations, the determining includes detecting, at 404, a loss of the communication link, waiting, at 406, for a time period, and determining, at 408, whether the communication link is reestablished before determining that the communication link has failed. The determining at 402 may be performed by a radio chipset of the network device.

At 410, the network device may then analyze one or more radio link layer logs to identify one or more components associated with another layer of the communication stack. Such components may include an operating system, a connection manager, an application controller, or an application.

At 412, the network device alerts one or more components associated with another layer of the communication stack, such as the identified one or more components of the determination that the communication link has failed. In some implementations, the determining at 402 and the alerting and 412 are performed independently of any link failure timers of the one or more components, such as RTP timers or application timers. The alerting may include alerting, at 414, a TCP layer component, analyzing, at 416, a TCP layer log, identifying, at 418, one or more applications from the TCP layer log, and alerting, at 420, the one or more applications. The alerting may also or instead include exposing, at 422, a status of the communication link and receiving, at 424, polling from the one or more components. At 426, the alerting may include providing one or more reasons for the failure of the communication link to the one or more components. The one or more components may utilize the one or more reasons to determine whether to terminate connections, wait, or reestablish connections. In some implementations, different ones of the one or more components may take different actions depending on at least one of the one or more reasons or a time since the determination of the failure of the communication link. At 428, the alerting may include instructing the one or more components to terminate connections, wait, or reestablish connections. At 430, the alerting may include broadcasting a notification of the determination that the communication link has failed.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A network device comprising:
   a processor;
   a radio chipset coupled to the processor, associated with a radio link layer of a communication stack, and configured to establish a radio communication link to a network and determine, as a failure, that the radio communication link has failed;
   one or more components coupled to the radio chipset and the processor, associated with one or more other layers of the communication stack, and configured to receive an alert of the failure of the radio communication link; and
   a timer associated with the one or more components and which initiates following the failure of the radio communication link,
   wherein the radio chipset is further configured to provide or make available the alert to the one or more components,
   wherein the one or more components include an application controller or connection manager configured to receive the alert, determine one or more applications with active connections, and provide the alert to the one or more applications, and
   wherein the radio chipset is configured to provide the alert to the one or more components within a time period that is less than a timeout period associated with the timer.

2. The network device of claim 1, wherein the radio chipset includes a radio link analyzer to:
   detect loss of the radio communication link;
   wait for a time period; and
   when the radio communication link is not reestablished, determine that the radio communication link has failed.

3. A method comprising:
   establishing, by a radio chipset coupled to a processor and associated with a radio link layer of a communication stack, a radio communication link to a network;
   determining, by the radio chipset, a failure of the radio communication link;
   initiating a timer associated with one or more components, wherein the initiating is based at least in part on the failure of the radio communication link;
   receiving, by the one or more components coupled to the radio chipset and the processor and associated with one or more other layers of the communication stack, an alert of the failure of the radio communication link, wherein the alert is provided or made available by the radio chipset within a time period that is less than a timeout period associated with the timer, wherein the one or more components include at least an application controller or connection manager;
   determining, by the application controller or the connection manager, one or more applications with active connections; and
   providing, by the application controller or the connection manager, the alert to the one or more applications.

4. The method of claim 3, wherein the determining the failure of the radio communication link comprises:
   detecting the failure of the radio communication link;
   determining that the time period has expired;
   determining that the radio communication link is not reestablished; and
   determining the failure based at least in part on the time period expiring and the radio communication link not being reestablished.

5. The method of claim 3, wherein the determining the failure is performed independently of a link failure timer associated with the one or more components.

6. The method of claim 3, further comprising analyzing one or more radio link layer logs to identify the one or more components.

7. The method of claim 3, further comprising:
alerting a transmission control protocol (TCP) layer component;
analyzing a TCP layer log; and
identifying the one or more applications from the TCP layer log.

8. The method of claim 3, further comprising:
exposing a status of the radio communication link; and
receiving polling from the one or more components.

9. The method of claim 3, further comprising providing one or more reasons for the failure of the radio communication link to the one or more components.

10. The method of claim 9, further comprising utilizing, by the one or more components, the one or more reasons to determine whether to terminate connections, wait, or reestablish connections.

11. The method of claim 10, wherein individual ones of the one or more components take different actions depending on at least one of the one or more reasons or a time since the determining the failure of the radio communication link.

12. The method of claim 3, further comprising instructing the one or more components to terminate connections, wait, or reestablish connections.

13. A non-transitory computer-readable medium having programming instructions stored thereon which, when executed by a network device, cause the network device to perform operations comprising:
establishing, by a radio chipset coupled to a processor and associated with a radio link layer of a communication stack, a radio communication link to a network;
determining, by the radio chipset, a failure of the radio communication link;
initiating a timer associated with one or more components, wherein the initiating is based at least in part on the failure of the radio communication link;
receiving, by the one or more components coupled to the radio chipset and the processor and associated with one or more other layers of the communication stack, an alert of the failure of the radio communication link, wherein the alert is provided or made available by the radio chipset within a time period that is less than a timeout period associated with the timer, wherein the one or more components include at least an application controller or connection manager;
determining, by the application controller or the connection manager, one or more applications with active connections; and
providing, by the application controller or the connection manager, the alert to the one or more applications.

14. The non-transitory computer-readable medium of claim 13, wherein the one or more components include an operating system, a connection manager, or an application.

15. The non-transitory computer-readable medium of claim 13, wherein the operations further comprise analyzing one or more radio link layer logs to identify the one or more components.

16. The non-transitory computer-readable medium of claim 13, wherein the determining the failure of the radio communication link comprises:
detecting the failure of the radio communication link;
determining that the time period has expired;
determining that the radio communication link is not reestablished; and
determining the failure based at least in part on the time period expiring and the radio communication link not being reestablished.

17. The non-transitory computer-readable medium of claim 13, wherein the determining the failure is performed independently of a link failure timer associated with one or more components.

18. The non-transitory computer-readable medium of claim 13, wherein the operations further comprise:
alerting a transmission control protocol (TCP) layer component;
analyzing a TCP layer log; and
identifying the one or more applications from the TCP layer log.

19. The non-transitory computer-readable medium of claim 13, wherein the operations further comprise:
exposing a status of the radio communication link; and
receiving polling from the one or more components.

20. The non-transitory computer-readable medium of claim 13, wherein the operations further comprise providing one or more reasons for the failure of the radio communication link to the one or more components.

* * * * *